United States Patent [19]

Blount

[11] 4,147,713

[45] Apr. 3, 1979

[54] PROCESS FOR THE PRODUCTION OF HALOHYDRIN REACTION PRODUCTS UTILIZING CYANIDE SILICATE COMPOUNDS

[76] Inventor: David H. Blount, 5450 Lea St., San Diego, Calif. 92105

[21] Appl. No.: 874,255

[22] Filed: Feb. 1, 1978

Related U.S. Application Data

[63] Continuation-in-part of Ser. No. 835,902, Sep. 23, 1977, Pat. No. 4,083,938, and a continuation-in-part of Ser. No. 801,819, May 31, 1977, Pat. No. 4,086,326, which is a continuation-in-part of Ser. No. 757,960, Jan. 10, 1977, abandoned.

[51] Int. Cl.$^2$ ............................ C07F 7/04; C07F 7/18; C07F 7/10

[52] U.S. Cl. ...................... 260/448.8 R; 260/448.2 E; 260/448.2 N; 528/38

[58] Field of Search ................. 260/448.2 N, 448.8 R, 260/448.2 E; 528/38

[56] References Cited

U.S. PATENT DOCUMENTS 4,011,253   3/1977   Blount ........................... 260/448.2 E

*Primary Examiner*—Paul F. Shaver

[57] ABSTRACT

Cyanide silicate compounds produced by heating an alkali cyanide compound with an oxidated silicon compound will react chemically with an epihalohydrin compound in the presence of a catalyst to produce resinous reaction products.

20 Claims, No Drawings

PROCESS FOR THE PRODUCTION OF HALOHYDRIN REACTION PRODUCTS UTILIZING CYANIDE SILICATE COMPOUNDS

CROSS-REFERENCE TO RELATED APPLICATIONS

This application is a continuation-in-part of my co-pending U.S. patent application Ser. No. 801,819, filed May 31, 1977 now U.S. Pat. No. 4,086,326, and U.S. patent application Ser. No. 835,902, filed Sept. 23, 1977 now U.S. Pat. No. 4,083,938, which is a continuation-in-part of U.S. patent application Ser. No. 757,960, filed Jan. 10, 1977, now abandoned.

BACKGROUND OF THE INVENTION

This invention relates to a process for the production of poly (halohydrin cyanide silicate) copolymers and poly (halohydrin amine cyanide silicate) copolymers. The cyanide-silicate compound is produced by reacting an alkali metal cyanide or hydrogen cyanide with a fine granular silicon acid to produce alkali metal cyanide silicate, dialkali metal dicyanide silicate, cyanide silicate and dicyanide silicate. These cyanide silicate compounds are very active chemically and will chemically react with halogenated organic compounds, amine compounds, organic phosphate compounds, isocyanate compounds, unsaturated organic compounds, sulfur, aldehydes, alcohols, inorganic acids, organic sulfate compounds, sulfur, aldehydes, alcohols, inorganic acids, organic sulfate compounds, organic nitrate compounds, organic oxides, peroxides, and may be used as an intermediate in the production of silicic organic acids, silicic organic amines, silicic organic isocyanides, silicic organic esters and other silicic organic compounds.

These cyanide silicate compounds will react chemically with halohydrins in the ratio of 2 mols of cyanide silicate compounds with 1 to 6 mols of the halohydrin compound. The reaction is enhanced by the presence of a catalyst such as an amine or Lewis acid. More than a catalytic amount of an amine may be used and will enter into the reaction.

The poly (epihalohydrin cyanide silicate) copolymers and poly (epihalohydrin amine cyanide silicate) copolymers may be produced in the form of foams, elastomers and thermosetting resinous reaction products. The foams may be used for insulation, acoustic material, packaging material, etc. The elastomer resins are thermosetting and may be poured into molds of useful products such as knobs, toys, balls, etc., then heated to 80° to 100° C. for a few minutes, thereby producing a solid elastomer product. The liquid thermosetting resin may be used as an adhesive, may be used in production of wet strength paper products, and may be molded into useful products such as gears, toys, knobs, rods, sheets, tubes, etc.

DETAILED DESCRIPTION OF THE INVENTION

I have discovered that an alkali metal cyanide will react chemically with a silicon oxide compound by heating them to just above the melting point of the alkali metal cyanide to produce alkali metal cyanide silicate compounds. The alkali metal cyanide silicate may be reacted chemically with an acid compound to produce cyanide silicate compounds. These cyanide silicate compounds may be produced by reacting a fine granular silicon oxide with hydrogen cyanide.

Any suitable cyanide compound may be used in the process of this invention. Typical cyanides include sodium cyanide, potassium cyanide, lithium cyanide, cadmium cyanide, cesium cyanide, ammonium cyanide, hydrogen cyanide and other metal cyanides. In general, best results have been obtained with alkali metal cyanides which are therefore preferred. Of these, optimum results are obtained with sodium and potassium cyanide.

The chemical reaction between hydrogen cyanide and the oxidated silicon compounds appears to be enhanced by the presence of an alkali catalyst. Any suitable alkali catalyst may be used such as alkali metal hydroxides or carbonates, sodium silicate, potassium silicate, alkali metal cyanides, alkaline, earth metal cyanides and other alkali compounds. The concentration of the alkali catalyst may vary from 1% to 10% by weight of the reactants. Sodium carbonate is the preferred alkali catalyst.

Any suitable oxidated silicon compound may be used in the process of this invention. Typical oxidated silicon compounds include hydrated silica, silica, hydrated silica with Si-H bonds (silicoformic acid) and natural occurring silicates containing free silicic acid groups and/or free oxide groups. The oxidated silicon compound is preferred to be in a fine granular form. The oxidated silicon compound may be produced by any of the commonly known methods.

While the reactants, oxidated silicon compound and cyanide compounds, may be mixed in any suitable proportions, generally approximately stoichiometric proportions are preferred. Thus, the formation of an alkali cyanide silicate or a cyanide silicate will require about 1 mol each of the oxidated silicon compound and the selected cyanide compound. Production of a substituted dicyanide silicate will generally require about 1 mol of an oxidated silicon compound for each 2 mols of the selected cyanide compound. There is usually a mixture of alkali cyanide silicate compounds produced.

I have discovered that the alkali metal cyanide silicate compounds and cyanide silicate compounds will react chemically with a halohydrin compound to produce halohydrin cyanide silicate resinous products. The chemical reaction is enhanced by the presence of a catalytic amount of a Lewis acid or an amine. An amount greater than the catalytic amount of the Lewis acid and the amine may be used and will enter into the reaction. The various Lewis acids are commonly known in the arts. The mineral acids are the preferred Lewis acids. Any of the commonly known amines may be used such as alkylenepolyamines, polyalkylenepolyamines, arylenediamines, ammonia, methylamine, propylamine, butylamine, amylamine, hexylamine, aniline, toluidine amine, xylidine amine, naphthylamine, benzylamine, and mixtures thereof.

Any suitable halohydrin may be used in the process of this invention. The halohydrins are derivatives of glycerol or glycols in which one terminal hydroxy group is substituted by a halogen atom, i.e., by chlorine, fluorine, bromine, or iodine, representative compounds being alphadichlorhydrin, epichlorohydrin, ethylene chlorohydrin, dibromhydrin, di-iodohydrin, epibromhydrin and mixtures thereof. In order to obtain a condensation product capable of cross-polymerization, the halohydrin should have at least 2 groups or radicals capable of reacting with a cyanide silicate compound. The halohydrin should be bifunctional or poly-functional by having another halogen atom, or it may be an epoxide. The preferred halohydrin is epichlorohydrin.

The silicate group present in the cyanide silicates will also react with hydroxyl radical and epoxy radical present in the halohydrin compounds or in polyols. Polyols may be used as cross-linking agents and improve tear resisting properties of the rubbery reaction products and the cellular solid reaction products.

Various organic compounds containing an amine radical may be used in this process such as aminocaproic acid, aminobenzoic acid, fatty acid amides with free amine groups, hydroxy amines and mixtures thereof. The polyamines may first be reacted with dicarboxyl acids, dicarboxyl anhydrides, epoxy compounds and carbon disulfide to produce polyamine compounds with unreacted amine groups that may be used in this invention.

The polyamine compounds may be reacted chemically with, silica, hydrated silica and silicoformic acid to produce organic polyamine silicate compounds, then may be reacted chemically with the cyanide silicate compounds and halohydrin compounds.

The alkali metal cyanide silicate compounds, alkali metal cyanide and dialkali metal dicyanide silicate, may be reacted together with a halohydrin. The dialkali metal dicyanide silicate is soluble in water and may be separated from the alkali metal cyanide silicate and then reacted separately with a halohydrin. The alkali metal cyanide silicate compounds may be reacted chemically with an acid compound to produce cyanide silicate compounds. These cyanide silicate compounds may be reacted together or separately with the halohydrin. The cyanide silicate and dicyanide silicate produced by reacting hydrogen cyanide with oxidated silicon compound may be separated. The dicyanide silicate is soluble in dilute sulfuric acid and may be filtered off to recover the cyanide silicate; then the dicyanide silicate is precipitated by adding an alkali compound to neutralize the sulfuric acid.

The chemical reactions of this invention may take place under any suitable physical condition. While many of the reactions will take place acceptably at ambient temperature and pressure, in some cases, better results may be obtained at somewhat elevated temperature and pressure. Preferably the reaction takes place at a temperature between ambient temperature and just above the melting temperature of the alkali cyanide in the production of the cyanide silicate compound. In the production of poly (halohydrin cyanide silicate) copolymers preferably the reaction takes place at a temperature between ambient and 100° C. In the production of poly (halohydrin amine cyanide silicate) precopolymers it is preferred to keep the temperature between ambient temperature and 70° C.; then the prepolymer is heated to 80° to 100° C. to produce a thermosetting reaction product.

The preferred method to produce the alkali cyanide silicate compounds is to mix one mol of an oxidated silicon compound with 1 to 2 mols of an alkali metal cyanide then heat the mixture to just above the melting point of the alkali cyanide while agitating for 10 to 30 minutes.

The preferred method to produce poly (halohydrin cyanide silicate) copolymers is to mix 1 mol of an alkali metal cyanide compound with 1 to 4 mols of a halohydrin compound then heating the mixture to just below the boiling temperature of the halohydrin while agitating for 5 to 90 minutes.

In an alternate method to produce poly (halohydrin cyanide silicate copolymers, a catalytic amount of a Lewis acid is added to a mixture of 1 mol of an alkali metal cyanide silicate mixture and 1 to 4 mols of a halohydrin compound while agitating for 5 to 90 minutes.

The preferred method to produce poly (halohydrin amine cyanide silicate) reaction products is to mix 1 mol of an alkali metal cyanide silicate compound with 0.1 to 1 mol of an amine then slowly add 1 to 4 mols of a halohydrin compound while keeping the temperature between ambient temperature and the boiling temperature of the reactants and agitating the mixture for 5 to 90 minutes.

In an alternate method, the alkali metal cyanide silicate is first treated with an acid to produce cyanide silicate and dicyanide silicate compounds then washed and filtered to remove the salt. Then water is added to the cyanide silicate and dicyanide silicate compounds before they are mixed with the amine compound and then the mixture is reacted as in the preferred method.

Cross-linking agents such as polyols, sodium polysulfides, polysulfides, epoxy resins, polychlorinated aliphatic compounds, polyepoxy compounds, aldehydes, ketones, acrylic acid compounds, allyl type halide compounds, sulfur, organic oxides, polyisocyanates and mixtures thereof may be added in the amount of 1% to 30% by weight, percentage based on the weight of the reactants.

Polyisocyanate compounds and liquid isocyanate terminated urethane prepolymers may be reacted with the poly (halohydrin cyanide silicate) copolymers in the amount of 0.5 to 1 part by weight of polyisocyanate to 1 part by weight of the poly (halohydrin cyanide silicate) copolymer or poly (halohydrin amine cyanide silicate) copolymer to produce a poly (urethane silicate) prepolymer. About 3% to 50% by weight of a curing catalyst is added and thoroughly mixed. The mixture expands to produce a rigid cellular solid reaction product.

The preferred polyisocyanate is 2,4-toluene diisocyanate, 2,6-toluene diisocyanate and mixtures thereof. Other arylene polyisocyanates and alkylene polyisocyanates may be used. Water is the preferred curing agent. The water may contain polyols, sodium silicate, silica, acetic acid, organic tin compounds, magnesium hydroxide and mixtures thereof in the amount of 0.01% to 40% by weight, percentage based on the weight of the water.

The primary object of the present invention is to produce poly (halohydrin cyanide silicate copolymer). Another object of the present invention is to produce poly (halohydrin amine cyanide silicate) copolymers. Another object of the present invention is to produce useful cellular solid products. Another object of the present invention is to produce useful thermosetting rubbery solid reaction products. Another object of the present invention is to produce useful thermosetting tough solid reaction products.

DESCRIPTION OF PREFERRED EMBODIMENTS

My invention will be illustrated in greater detail in the specific examples which follow, which details the preferred embodiments of my process. It should be understood that the scope of my invention is not limited to the specific processes set out in the Examples. Parts and percentages are by weight, unless otherwise indicated.

EXAMPLE 1

About 1 part by weight of fine granular hydrated silica and 2 parts by weight of sodium cyanide are mixed then heated to just above the melting temperature of sodium cyanide while agitating at ambient pressure for 10 to 30 minutes thereby producing a mixture of sodium cyanide silicate and disodium disyanide silicate.

About 10 parts by weight of water are added to the mixture while agitating. Disodium dicyanide silicate goes into solution and is filtered off thereby recovering grayish brown granules of sodium cyanide silicate.

Dilute hydrochloric acid is added to the sodium cyanide silicate until the pH is about 7 to 8, then the sodium chloride and water is filtered off thereby recovering cyanide silicate granules.

Dilute sulfuric acid is added to the solution of disodium dicyanide silicate until the pH is 7 to 8 thereby precipitating dicyanide silicate. The sodium sulfate and water is filtered off thereby recovering the dicyanide silicate.

EXAMPLE 2

One mol of fine granular silica and one mol of potassium cyanide are mixed in about equal weight of water then heated to about 90° to 100° C. until the water is evaporated; then the temperature is elevated to just above the melting point of potassium cyanide while agitating at ambient pressure for 10 to 30 minutes thereby producing a mixture containing a small amount of dipotassium dicyanide silicate and a greater amount of potassium syanide silicate.

Water is added to the mixture and the disodium dicyanide silicate goes into solution and is filtered off thereby recovering the potassium cyanide and a small amount of silica.

Dilute sulfuric acid is added to the potassium cyanide until the pH is 7 to 8; then the water and potassium sulfate is filtered off thereby recovering cyanide silicate.

EXAMPLE 3

A fine granular mixture of hydrated silica and hydrated silica containing si-H bonds (silicoformic acid) in the amount of about 2 mols are mixed with 3 mols of sodium cyanide then heated to just above the melting temperature of sodium cyanide while agitating at ambient pressure for 10 to 30 minutes, thereby producing a mixture of sodium cyanide silicate and disodium dicyanide silicate.

EXAMPLE 4

About 1 part by weight of the mixture of sodium cyanide silicate and disodium dicyanide silicate as produced in Example 1 and 2 parts by weight of epichlorohydrin are mixed then agitated at a temperature between ambient and the boiling temperature of epichlorohydrin for 10 to 30 minutes; then a Lewis acid, concentrated sulfuric acid, is added in the amount of 0.1 part by weight while agitating at ambient pressure for 5 to 30 minutes, thereby producing a thick liquid, dark brown poly (epichlorohydrin cyanide silicate) copolymer.

EXAMPLE 5

About 1 part by weight of the mixture of sodium cyanide and disodium dicyanide silicate and 1 part by weight of ethylenediamine are mixed; then 3 parts by weight of epichlorohydrin are slowly added while agitating and keeping the temperature between ambient and 70° C., thereby producing a liquid poly (epichlorohydrin ethylene diamine cyanide silicate) prepolymer.

The prepolymer is heated to 80° to 100° C. and the mixture begins to expand. It expands 3 to 10 times its original volume to produce a soft cellular solid reaction product.

EXAMPLE 6

About 1 part by weight of a mixture of sodium cyanide silicate and disodium dicyanide silicate as produced in Example 3, 1 part by weight of diethylene triamine and 8 to 20 parts by weight of water are mixed; then epichlorohydrin is slowly added while agitating and keeping the temperature below the boiling temperature of the reactants. After about 20 to 90 minutes the reactants coagulate into a rubbery, grayish, poly (epichlorohydrin amine cyanide silicate) reaction product.

EXAMPLE 7

About one mol of the dry granules of sodium cyanide silicate and 2 mols of epichlorohydrin are mixed; then one mol of concentrated phosphoric acid is added while agitating for 5 to 20 minutes, thereby producing a thick, brown, liquid, poly (epichlorohydrin cyanide silicate) reaction product. The reaction product is mixed with water to remove the salt then decanted off.

The reaction product will react with a polyisocyanate, toluene disocyanate, to produce a rigid cellular solid product by mixing about equal parts by weight for 10 to 30 minutes then adding a curing catalyst such as 10% by weight of an aqueous solution containing 20% by weight of sodium silicate while agitating for 5 to 20 minutes. The mixture expands 6 to 10 times its original volume to produce a rigid cellular solid reaction product.

EXAMPLE 8

About 1 mol of the dry granules of sodium cyanide silicate as produced in Example 2 and one mol of 1,6-hexamethylenediamine are mixed; then 1.5 mols of epichlorohydrin are slowly added while keeping the temperature between ambient temperature and 70° C. and agitating, thereby producing a liquid poly (epoxy cyanide silicate) prepolymer. The prepolymer is heated to 80° to 100° C., and the prepolymer expands to 3 to 10 times its original volume to produce a soft cellular solid reaction product.

EXAMPLE 9

About 1 part by weight of sodium cyanide silicate as produced in Example 1 and 1 part by weight of propylenediamine are mixed in 8 parts by weight of water; then 2 parts by weight of epichlorohydrin are slowly added while agitating and keeping the temperature below 70° C. for 10 to 30 minutes or until the reaction is complete, thereby producing a poly (epichlorohydrin amine cyanide silicate) prepolymer.

The prepolymer is poured into a mold of useful products then heated to 80° to 100° C. thereby producing a thermosetting rubbery solid reaction product.

EXAMPLE 10

About 1 mol of cyanide silicate as produced in Example 2 and 2 mols of epichlorohydrin are mixed. Then 0.05 part by weight of concentrated sulfuric acid (a Lewis acid) is added to the mixture while agitating for 5 to 20 minutes, thereby producing a liquid poly (epichlorohydrin cyanide silicate) reaction product.

About equal weight of the reaction product and toluene diisocyanate are mixed then agitated for 10 to 30 minutes thereby producing a polyurethane cyanide silicate prepolymer. Then about 3% by weight of water, percentage based on the weight of reactants, is thoroughly mixed with the prepolymer. In 5 to 20 minutes the mixture begins to expand. It expands 6 to 10 times its original volume thereby producing a rigid cellular solid reaction product, useful as insulation, sound proofing, etc.

EXAMPLE 11

About 1 part by weight of cyanide silicate as produced in Example 1 and 1 part by weight tetraethylenepentamine are mixed; then 2 parts by weight of epichlorohydrin are slowly added while agitating and keeping the temperature below 70° C. thereby producing a liquid poly (epichlorohydrin tetraethylene pentamine cyanide silicate) prepolymer.

The prepolymer and 1 part by weight of a fine granular silica are mixed then heated to 80° to 100° C., and the prepolymer expands 6 to 10 times its original volume thereby producing a soft cellular solid reaction product.

EXAMPLE 12

About 1 mol of cyanide silicate as produced in Example 4, 0.5 mol of ethylamine, 0.5 mol of triethylenetetramine and 20 mols of water are mixed; then epichlorohydrin is slowly added over a period of 90 minutes while keeping the temperature below 70° C. while agitating, thereby producing a thermosetting poly (halohydrin amine cyanide silicate) prepolymer.

The prepolymer is poured into a mold then heated to 80° to 100° C. thereby producing a solid reaction product.

EXAMPLE 13

About 1 part by weight of dicyanide silicate as produced in Example 4 and 0.5 parts by weight of fatty acid amide with free amine groups are mixed; then 3 parts by weight of epichlorohydrin are slowly added while agitating and keeping the temperature below 70° C. until the reaction is complete. The mixture is then poured into molds of toys, gears, knobs, etc., and is heated to 80° to 100° C. thereby producing a tough, solid reaction product.

EXAMPLE 14

About 1 part by weight of the mixture of sodium cyanide silicate and disodium dicyanide silicate as produced in Example 1 and 1 part by weight of diethylene triamine are mixed in 20 parts by weight of water; then 2 parts by weight of alphadichlorhydrin are slowly added while agitating and keeping the temperature between ambient temperature and 70° C. for about 90 minutes. The mixture is then heated to 80° to 100° C. while agitating, and a rubbery, solid reaction product is coagulated from the water.

EXAMPLE 15

About 1 part by weight of the disodium dicyanide silicate as produced in Example 1 and 1 part by weight of ethylene chlorohydrin are mixed then heated to just below the boiling temperature of ethylene chlorohydrin for 10 to 30 minutes thereby producing ethylene chlorohydrin sodium dicyanide silicate compound. To this compound 1 part by weight of diethylene triamine is added and mixed thoroughly; then 2 parts by weight of epichlorohydrin are slowly added while agitating and keeping the temperature between ambient temperature and 70° C. for about 90 minutes. The mixture is then heated to 80° to 100° C. thereby producing a solid poly (halohydrin amine cyanide silicate) resinous product.

EXAMPLE 16

About 1 part by weight dicyanide silicate, 0.5 part by weight of methylamine in an aqueous solution, 1 part by weight of di (pentamethylene) triamine, 0.5 part by weight of ammonia and 20 parts by weight of water are mixed; then 2 parts by weight of epichlorohydrin are slowly added while agitating and keeping the temperature between ambient temperature and 70° C. for about 30 minutes. About 0.5 part by weight of sodium cyanide as produced in Example 1 is added; then 1 part by weight of epichlorohydrin is slowly added while agitating, thereby producing an aqueous solution of poly (halohydrin amine cyanide silicate) reaction product.

The aqueous thermosetting reaction product may be used as an adhesive for paper products by adding the aqueous reaction product to the wood pulp then drying the paper at 80° to 100° C., thereby evaporating the water and producing a solid, wet strength adhesive on the paper.

EXAMPLE 17

About 1 part by weight of cyanide silicate as produced in Example 2, 1 part by weight of propylenediamine, 1 part by weight of water and 1 part by weight of polyethylene glycol (450 to 500 mol. wt.) are mixed; then 2 parts by weight of epichlorohydrin are slowly added while agitating and keeping the temperature between ambient and 70° C. for about 30 minutes; then the mixture is poured into molds of useful objects and heated to 80° to 100° C., thereby producing gray, solid, rubbery, useful reaction products.

EXAMPLE 18

About 1 part by weight dicyanide silicate as produced in Example 1, 1 part by weight of diethylenetriamine and 4 parts by weight of water are mixed; then a dilute mineral acid, hydrochloric acid, is added until the pH is about 7 to 8. Epichlorohydrin is slowly added to the mixture while agitating and keeping the temperature below 70° C. for about 60 minutes, thereby producing a tan, liquid, thermosetting reaction product.

EXAMPLE 19

About 1 part by weight of dicyanide silicate as produced in Example 1, 0.5 part by weight of fine granular hydrated silica, and 1 part by weight of di (hexamethylene) triamine are mixed; then a mixture, containing 1 part by weight of epichlorohydrin and 1 part by weight of an epoxy resin containing 2 or more reactive epoxy groups (produced by reacting 2 mols of epichlorohydrin with one mol of Bisphenol A), is slowly added while agitating and keeping the temperature between ambient temperature and 70° C. for about 30 minutes. The mixture is then heated to 80° to 100° C., and in 5 to 20 minutes it expands 6 to 10 times its original volume to produce a semi-rigid, cellular solid reaction product.

EXAMPLE 20

About 1 mol of fine granular hydrated silica, 1 mol of ethylenediamine and 10% by weight of sodium carbonate, percentage based on weight of hydrated silica, are mixed then heated to just below the boiling temperature of ethylene diamine while agitating at ambient pressure for 20 to 60 minutes, thereby producing ethylenediamine silicate, an amine silicate compound.

The ethylenediamine silicate compound and 1 mol of dicyanide silicate are mixed; then 2 mols of epichlorohydrin are slowly added while agitating and keeping the temperature between ambient temperature and 70° C. for about 30 to 90 minutes. The mixture is then heated to 80° to 100° C. thereby producing a thermosetting solid reaction product.

Other amine compounds may be used in place of ethylenediamine to produce amine silicate compounds.

Although specific materials and conditions were set forth in the above Examples, these were merely illustrative of preferred embodiments of my invention. Various other compositions, such as the typical materials listed above may be used, where suitable. The reaction mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended claims.

I claim:

1. The process for the production of poly (halohydrin cyanide silicate) reaction products by the following steps:
   (a) adding 1 to 2 mols of an alkali metal cyanide compound;
   (b) admixing about 1 mol of an oxidated silicon acid;
   (c) heating the mixture to just above the melting temperature of the alkali metal cyanide compound while agitating at ambient pressure for 10 to 30 minutes, thereby
   (d) producing a mixture of alkali metal cyanide silicate compounds;
   (e) adding 0 to 2 mols of an epoxide catalyst;
   (f) adding 1 to 4 mols of a halohydrin compound;
   (g) keeping the temperature between ambient and the boiling temperature of the reactants while agitating for 5 to 90 minutes, thereby
   (h) producing poly (halohydrin cyanide silicate) reaction product.

2. The process of claim 1 wherein the alkali metal cyanide is selected from the group consisting of sodium cyanide, potassium cyanide and mixtures thereof.

3. The process of claim 1 wherein the oxidated silicon compound is selected from the group consisting of silica, hydrated silica, silicoformic acid and mixtures thereof.

4. The process of claim 1 wherein the halohydrin is an epihalohydrin, epichlorohydrin.

5. The process of claim 1 wherein the epoxide catalyst is a Lewis acid.

6. The process of claim 1 wherein the epoxide catalyst is an amine selected from the group consisting of alkylenepolyamines, polyalkylenepolyamines, arylenediamines, ammonia, or mixtures thereof, and added in the amount of 0.1 to 2 mols in step (e), thereby producing poly (halohydrin amine cyanide silicate) reaction product in step (h) of claim 1.

7. The process of claim 6 wherein the amine compound is first reacted with an oxidated silicon compound, selected from the group consisting of hydrated silica, silica, silicoformic acid and mixtures thereof.

8. The process of claim 1 wherein the alkali cyanide compound is first reacted with a mineral acid to produce hydrogen cyanide, thereby producing a mixture of cyanide silicate and dicyanide silicate in step (d) of claim 1.

9. The process of claim 1 wherein a dilute mineral acid is added in step (d) of claim 1 to the mixture of alkali metal cyanide silicate compounds until the pH is about 7 to 8; then the water and salt is filtered off, thereby recovering a mixture of cyanide silicate and dicyanide silicate and is added in step (d) of claim 1.

10. The process of claim 1 wherein water is added in step (d) of claim 1 and the dialkali metal dicyanide compound goes into solution and is filtered from the alkali metal cyanide; the alkali metal cyanide is utilized in step (d) of claim 1.

11. The process of claim 1 wherein water is added following step (d) of claim 1.

12. The process of claim 1 wherein water is added in step (d) of claim 1, and the dialkali metal dicyanide compound goes into solution and the alkali metal cyanide compound is removed by filtration, thereby leaving the aqueous solution of dialkali metal dicyanide silicate in step (d) of claim 1.

13. The process of claim 1 wherein the halohydrin, epichlorohydrin, is first reacted with a polyhydroxy compound to produce an epoxy resin containing 2 or more reactive epoxy groups per molecule.

14. The process of claim 1 wherein an alkali metal hydroxide and sulfur condensation product is produced by heating 1 part by weight of an alkali metal hydroxide selected from the group consisting of sodium hydroxide and potassium hydroxide and 1 to 2 parts by weight of sulfur to just above the melting point of sulfur while agitating for 10 to 30 minutes, then is added in step (d) of claim 1 in amount of 0.5 to 1 part by weight, based on 1 part by weight of the cyanide compound.

15. The process of claim 1 wherein a polyol is added in step (d) of claim 1 in the amount of 0.5 to 1 part by weight to 1 part by weight of the cyanide silicate compound.

16. The process of claim 1 wherein a polyisocyanate, selected from the group consisting of 2,4-toluene diisocyanate, 2,6-toluene diisocyanate and mixtures thereof, is mixed with the liquid poly (halo-hydrin cyanide silicate) reaction product in step (h) of claim 1 in the amount of 0.5 to 1 part by weight of the polyisocyanate to 1 part by weight of the liquid poly (halohydrin cyanide silicate) reaction product, then agitated for 10 to 20 minutes at ambient temperature; then a curing agent in the amount of 3% to 50%, percentage based on the weight of the reactants, is added and thoroughly mixed; the mixture expands 6 to 10 times its original volume thereby producing a poly (urethane silicate) cellular solid.

17. The process of claim 16 wherein the curing agent is water, water containing 0.01% to 40% sodium silicate, water containing 0.01% to 40% polyol, water containing 0.01% to 40% magnesium hydroxide, and mixtures thereof.

18. The product is produced by the process of claim 16.

19. The product, poly (halohydrin cyanide silicate) reaction products, as produced by the process of claim 1.

20. The product, poly (halohydrin cyanide silicate) reaction products, as produced by the process of claim 7.

* * * * *